United States Patent [19]

Dibugnara

[11] 3,844,029

[45] Oct. 29, 1974

[54] HIGH POWER DOUBLE-SLUG DIODE PACKAGE

[75] Inventor: Raymond Dibugnara, Huntington Beach, Calif.

[73] Assignee: TRW Inc., Los Angeles, Calif.

[22] Filed: Aug. 15, 1973

[21] Appl. No.: 388,612

Related U.S. Application Data

[62] Division of Ser. No. 222,788, Feb. 2, 1972, abandoned.

[52] U.S. Cl. .................................. 29/588, 317/234
[51] Int. Cl. ............................................. B01j 17/00
[58] Field of Search .................... 29/588; 317/234 F

[56] References Cited

UNITED STATES PATENTS

| | | | |
|---|---|---|---|
| 3,300,841 | 1/1967 | Fisher | 29/588 |
| 3,621,563 | 11/1971 | Gee | 29/588 |
| 3,631,589 | 1/1971 | Garceau | 29/588 |
| 3,689,392 | 9/1972 | Sandera | 317/234 F |

*Primary Examiner*—Roy Lake
*Assistant Examiner*—W. Tupman

[57] ABSTRACT

This invention is an improved, high power double-slug diode package, and a novel method for making the same. A preferred embodiment of the present invention is comprised of a pair of solid cylindrical molybdenum slugs having metallically coated end faces; a semiconductor die sandwiched between adjacent end faces of the pair of slugs, the surfaces of the die contacting the end faces of the slugs being metallically coated; a glass envelope entirely encapsulating the semiconductor die and the adjacent halves of the slugs; and a conductive lead brazed to the outer end face of each of the slugs. A novel feature of the present invention lies in the chemical bond achieved between the glass and the surface of the slugs. In the preferred embodiment described hereinbelow, each of the molybdenum slugs has a layer of molybdenum oxide disposed over that portion of its circumferential surface which is not metallically coated. The glass and molybdenum oxide form a chemical bond which provides a superior seal and greater strength than heretofore attainable. The seal renders the invented package substantially impervious to moisture, water, gas and other contaminants. The strength provided by the glass to molybdenum oxide chemical bond is sufficient to preclude having to braze the die to the slug faces in order to achieve satisfactory assembly strength as has been the practice of the prior art. A preferred method for making the invented package comprises the steps of metallically coating the cylindrical slugs of molybdenum; masking and etching the slugs so as to leave the metallic coating only on the end faces and adjacent circumferential edges thereof; oxidizing the uncoated molybdenum surfaces of the slugs; loosely assembling the semiconductor die, the slugs and a glass sleeve in a jig, the slugs and die being disposed within the glass sleeve, heating the assembly in an evacuated chamber to the point where the glass becomes molten; injecting nitrogen gas into the chamber causing the glass sleeve to collapse around the slugs and die; and brazing leads to the outer end faces of the slugs. A novel feature of the invented method is the above-described sealing step where, in a single step, the slugs and die are forced together, sealed and held in their contacting space relation by the chemical bond formed between the molten glass and the molybdenum oxide. An additional novel feature of the invented method lies in the fact that the sealing step can be carried out at relatively low temperatures; i.e., temperatures significantly below those required to braze the die to the slugs as disclosed by the prior art.

6 Claims, 14 Drawing Figures

HIGH POWER DOUBLE-SLUG DIODE PACKAGE

This is a division of application Ser. No. 222,788, filed Feb. 2, 1972, and now abandoned.

BACKGROUND OF THE INVENTION

1. Field of the Invention

This invention relates to semiconductor devices and more particularly to an improved high power double-slug diode assembly with conductive leads and a novel method for making the same.

2. Prior Art

The double-slug diode was introduced by the semiconductor industry to overcome the power limitations and other shortcomings characteristic of diodes constructed by soldering fine wire leads, i.e., "cat whiskers," to opposite faces of a semiconductor die. The double-slug diode of the prior art is typically comprised of slugs of molybdenum or tungsten, which slugs are fully coated with a protective layer of gold, silver or other noble metal. Often an undercoat of nickel or cobalt is deposited between the slug and the layer of protective coating. A semiconductor die, having a PN junction, is disposed between the coated slugs and then brazed on both its sides to the end faces of the slugs. Typical bonding materials disclosed by the prior art include alloys of silver, platinum, palladium and gold, alloys having fusion temperatures between 900°C and 1,050°C being preferred. After the semiconductor die is securely brazed to the end faces of the slugs, an etching or cleansing step typically follows in order to remove any contamination which may be deposited around the exposed circumferential edge of the semiconductor die during the brazing operation. After cleansing, the die and the adjoining surfaces of the slugs are encapsulated in glass. Encapsulation is accomplished by slipping a glass sleeve over the fused slugs and die and then heating the assembled configuration to the softening temperature of the glass. The softening temperature of the glass is typically below the fusion temperature of the bonding material used to braze the die to the slugs in order not to disturb the latter bond. An alternate is to entirely forego the brazing of the silicon die to the metallic slug and to depend entirely upon the mechanical strength of the package itself to hold the slugs in contact with the die.

The above-described double-slug diode disclosed by the prior art has several significant disadvantages and shortcomings. In the first place, the seal achieved between the glass lead and the metallic coating deposited over the surface of the slugs is not a strong chemical bond. As a result, no significant assembly or holding strength is obtainable from the glass to retal seal. The assembly is held together primarily and substantially by the fusion of the semiconductor die to the end faces of the slugs. The holding strength of a diode is measured in the industry by the so-called "pull test" wherein the leads of the diode are forcibly pulled apart. Diodes disclosed by the prior art cannot uniformly and consistently withstand pull test forces around 18 pounds. This limitation is a consequence of the dependence upon the die to slug bond for holding strength. The present invention overcomes this shortcoming by teaching a method for achieving a very strong chemical bond between the glass and the surface of the slugs. Instead of a glass to metal seal, this invention discloses a glass to molybdenum oxide seal, i.e., a seal formed by the fusion of the glass and the molybdenum oxide. By virtue of the strength of the chemical bond between the glass and molybdenum oxide it is no longer necessary to braze the semiconductor die to the end faces of the slugs. Even without the holding strength contributed by the fusion of the die to the slugs, the invented diode package is capable of consistently passing an 18 pound pull test, a strength nearly double that typical of the diode packages disclosed by the prior art.

The elimination of the requirement to braze the semiconductor die to the end faces of the slugs in order to hold the assembly together provides a significant advantage in respect to controlling the electrical parameters of the diode. Heretofore, the semiconductor die had to be subjected to the relatively high temperatures required for satisfactory bonding of the die to the slugs (900°C – 1,050°C). At such high temperatures the electrical characteristics of the die may be adversely affected by a possible disturbance of the distribution and/or density of impurities previously diffused through the semiconductor material in order to form the PN junction. This possibility is particularly acute when gold is used as a semiconductor dopant in order to increase the diode switching time. In addition, the coating and bonding metals may themselves partially diffuse through the semiconductor material during the high temperature brazing step, contributing further to the possible adverse effects on the diode's electrical performance. The only other alternative to brazing the die to the slug is to depend solely upon the glass sleeve to metal slug bond strength, which at best is a mechanical "pressure" contact seal. Since the present invention enables the elimination of the high temperature die to slug brazing, better control of the diode's performance parameters is now possible. As indicated earlier, the advantage obtained by no longer being required to braze to die to the slugs does not come at the expense of assembly or holding strength. To the contrary, the holding strength of the invented diode package is greater without brazing than heretofore achievable by such brazing as taught by the prior art. It should be understood that the present invention does not preclude die to slug brazing. Some degree of bonding may be achieved at temperatures which do not significantly affect the semiconductor material. Such bonding would provide additional strength to that provided by the glass to molybdenum oxide chemical bond. The superior glass to molybdenum oxide bond disclosed by the present invention, which makes possible the elimination of high temperature die to slug brazing, can be achieved at temperatures in the range of 650°C – 800°C, temperatures which will not significantly affect the semiconductor material.

The greater holding strength of the invented diode package overcomes a reliability limitation characteristic of diodes of prior art, namely, failure due to intermittent contact between the die and the slug. Diodes in the field are typically handled, pulled, shaken and otherwise subjected to random pulling forces. The greater the assembly or holding strength of the diode, the less likely is the occurrence of a failure mode involving separation of the die from the slug. Obviously, the invented diode, by virtue of its greater holding strength, can better withstand the random pulling forces to which it may be subjected.

Another shortcoming of the double-slug diodes disclosed by the prior art is the quality of the glass to metal seal in respect to its ability to keep out moisture, water, gas and other impurities. Little chemical fusion takes place between the glass and the metal coating on the surface of the slugs. Contact is maintained primarily by the pressure of the glass envelope against the slug surface. As a result, the seal does not always render the diode package impervious to moisture, water, gas and impurities. In addition, the lower the temperature at which the glass encapsulation is carried out, the greater is the degradation of the quality of the seal. Thus, if a particular application requires lower temperature brazing of the semiconductor die to the slugs, and, therefore, equal or even lower temperature for the glass encapsulation, both the quality of the seal and the holding strength of the diode package are significantly reduced. The present invention, on the other hand, teaches the removal of the protective metallic coating from the central portion of the slugs and the oxidation of the molybdenum before sealing the assembly in a glass envelope. The glass to molybdenum oxide seal achieved is the result of a bond formed by molybdenum oxide chemically dissolving into the glass. As a result, the seal obtained is substantially impervious to moisture, water, gas and impurities; in addition, it will tend to have a higher vacuum hermeticity than heretofore attainable. A very significant characteristic of the glass to molybdenum oxide seal is that fusion occurs at relatively low temperatures, i.e., at temperatures at which a typical glass to metal seal such as, for example, glass to silver, would be inadequate.

Other advantages of the present invention include the following: the present invention discloses a method which enables the slugs and die to be forced together, sealed and permanently held in place in a single step, whereas the prior art teaches a two step method, a first step to braze the semiconductor die to the slugs and a second step to encapsulate the assembly in glass. The one step method of the present invention reduces the number of temperature cycles to which the diode package is subjected and, further reduces handling and processing time. The latter will tend to reduce the cost of production. Still another advantage of the present invention is that the method disclosed for encapsulating in glass the surface of the die and adjacent portion of the slugs substantially entraps any possible contaminants which may be present on these surfaces and prevents them from migrating or being dislodged to positions where they may adversely affect the performance or operation of the diode. This method is the injection of nitrogen gas under pressure into a previously evacuated furnace wherein the diode assembly has been placed. The injection of the gas takes place after the glass has become molten and has already effected a seal to the slug. The pressure of the gas on the molten glass causes the glass to collapse into the void created by the vacuum. As a result, the glass substantially fills the entire space between the slugs and the semiconductor die. The glass encapsulation of diodes by the methods disclosed by the prior art does not always entrap contaminants to the same degree as achieved by the invented method and, thus, diodes of the prior art are more susceptible to failure due to such internal contaminants. A further advantage of the present invention over devices disclosed by the prior art is that the glass to molybdenum oxide bond is capable to maintaining a superior seal under the high power and high temperature conditions to which the diode package is subjected.

Thus, there has heretofore been no high power double-slug diode which combines in one structure the features of improved holding strength, reliability, hermeticity and improved seal found in the present invention, nor has there heretofore been disclosed a method for making a double-slug diode which has the above-described advantages associated with the novel method disclosed herein.

BRIEF SUMMARY OF THE INVENTION

This invention includes an improved high power, double-slug diode package and a novel method for its manufacture. In a preferred embodiment of this invention a disk-shaped semiconductor die, having metallically coated faces and a passivatior oxide layer over its circumferential edge, is disposed between a pair of solid, cylindrical electrically conducting slugs. The preferred slug material is molybdenum because (i) it has a coefficient of thermal expansion which is compatible with that of the semiconductor die and that of the glass sleeve, and (ii) because molybdenum oxide is both advantageous for forming a seal with glass and is readily grown. The molybdenum slugs slugs are substantially identical, each having thin layers of silver over nickel deposited over its end faces and over edge portions of its circumferential surfaces. A layer of molybdenum oxide is deposited over the uncoated remainder of its circumferential surfaces. The faces of the semiconductor die are held in close mechanical and therefore electrical contact with the end faces of the slugs by an encapsulating glass envelope which is chemically bonded to the molybdenum oxide on the surfaces of the slugs. In addition to holding the diode assembly together, the glass to molybdenum bond provides a seal which renders the package substantially impervious to moisture, water, gas and impurities. A conductive lead is securely fixed to the outer end face of each of the slugs by being brazed thereto with a suitable alloy eutectic.

The present invention also includes a novel and improved method of making the invented diode package. The semiconductor die is made by techniques well-known in the art, including techniques related to the diffusion of PN junctions, passivation of junctions and deposition of metallic coatings. The structure of the molybdenum slugs can be achieved in three ways. A first way utilizes novel masking and etching techniques after the slugs are lapped and polished and coated with the layers of nickel and silver. After the etching step, the slugs are cleaned and then placed into an oxidizing atmosphere. As a result of oxidation, the uncoated surface of the slug acquires a layer of molybdenum oxide which fuses to the glass sleeve when subjected to the heat of a subsequent sealing step. In a second way of achieving the desired structure of the slugs, a plurality of molybdenum wires, each having a diameter corresponding to that of the slugs, is bound in a thin metal tube, after which a suitable epoxy compound is injected into the interstices formed therein. The tube is then "thin sliced" to a thickness corresponding to the desired length of the slugs. After some lapping and tumble polishing, the exposed faces of the slugs are coated with layers of silver over nickel. The epoxy is then chemically removed and the slugs removed from the "slice." This latter method results in slugs which are metallically coated only on their end faces, i.e., with little, if any, nickel and silver over their circumferential edges. The slugs are then oxidizing as described above to acquire a layer of molybdenum oxide over the uncoated portions of their circumferential surfaces. A third way of achieving the desired structure of the slugs is to grind off from the circumferential surfaces of the slugs previously coated layers of silver over nickel. This results in slugs having the metallic coating on their end faces. The slugs are then oxidized to acquire the desired circumferential layer of molybdenum oxide.

Having completed the making of the slugs and the semiconductor die, the invented diode package is then assembled. First, a die is sandwiched between a pair of slugs. Next a glass sleeve is slipped over the slug-die assembly. A suitable glass is one which becomes molten at a relatively low temperature and which has a coefficient of expansion compatible with that of molybdenum and the semiconductor material, typically silicon or silicon carbide. The entire assembly is loosely held in place by a FIG. The jig is then heated in an evacuated furnace to the temperature at which the glass becomes molten and effects a seal to the molybdenum oxide. At this point nitrogen gas under pressure is injected into the furnace causing the glass sleeve to collapse into the void between the slugs and the die, completing the chemical bond between the glass and the molybdenum oxide as the molybdenum oxide chemically dissolves into the glass. The resulting seal is one of the novel features of this invention. At the same time the end faces of the slugs are forced into intimate contact with the faces of the die and held in such position by the collapsed glass envelope. A conductive lead is then brazed onto the outer end face of each of the slugs.

Thus, it is a principal object of the present invention to provide a high power double-slug diode package having an improved glass to slug seal formed by a chemical bond.

It is another principal object of this invention to provide a high power double-slug diode package which has superior holding strength without the brazing of the semiconductor die to the slugs.

It is yet another principal object of this invention to provide a method for assembling the invented diode package in one step at a relatively low temperature which does not adversely affect the distribution and/or density of any dopant in the semiconductor material.

A further object of the present invention is to provide a method for glass encapsulation which permanently entraps any possible internal contaminants so as to prevent their migration or dislodgment to positions in which they may cause an electrical failure of the diode.

Other objects, novel features and advantages of the present invention will become apparent upon making reference to the following detailed description and the accompanying drawings. The description and the drawings will also further disclose the characteristics of this invention and its structure. Although a preferred embodiment of the invention is described hereinbelow, and shown in the accompanying drawings, it is exposely understood that the description and drawings thereof are for the purpose of illustration only and do not limit the scope of this invention.

DETAILED DESCRIPTION OF THE INVENTION

Figure 1:
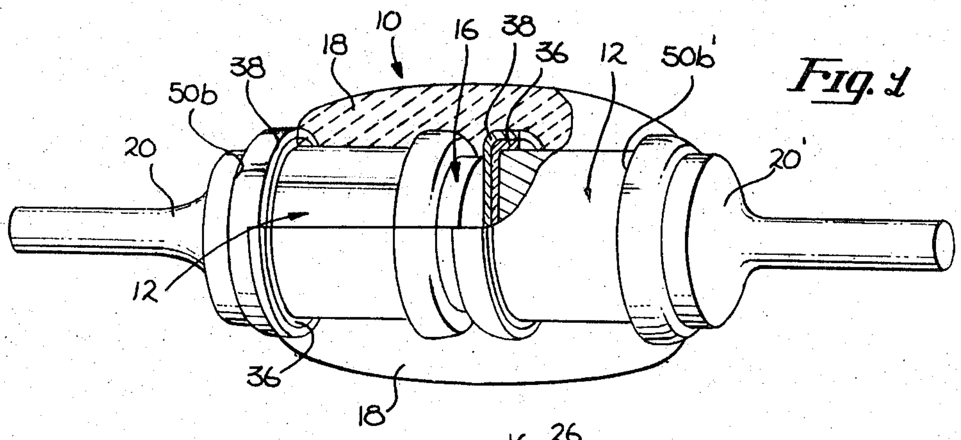
FIG. 1 is a partially broken away front perspective view of the invented diode package showing a cross-sectional view of a portion of one of its slugs.

With reference to FIG. 1–14, a presently preferred embodiment of this invention is described in detail. The drawings show the significant structural features of the invented diode package made according to the invention but the proportions and geometric forms of the parts of actual devices may and often will be different from the proportions and geometrical forms of the corresponding parts as shown in the drawings. Shown in FIG. 1 is a high power double-slug diode package 10 comprising a pair of substantially identical electrically conducting cylindrical slugs 12 and 12′, preferably molybdenum, each having a metallic coating disposed over its end faces and circumferential edges, the preferred coating being a layer of silver 38 over a layer of nickel 36; a semiconductor die 16 disposed between the pair of slugs 12 and 12′; a glass envelope 18 which encapsulates and seals the semiconductor die 16 and a significant portion of each of the slugs 12 and 12′; and conductive leads 20 and 20′ brazed to the outer faces **50*b* and 50*b*′ of slugs 12 and 12′** respectively.

Figures 2, 3, 4:
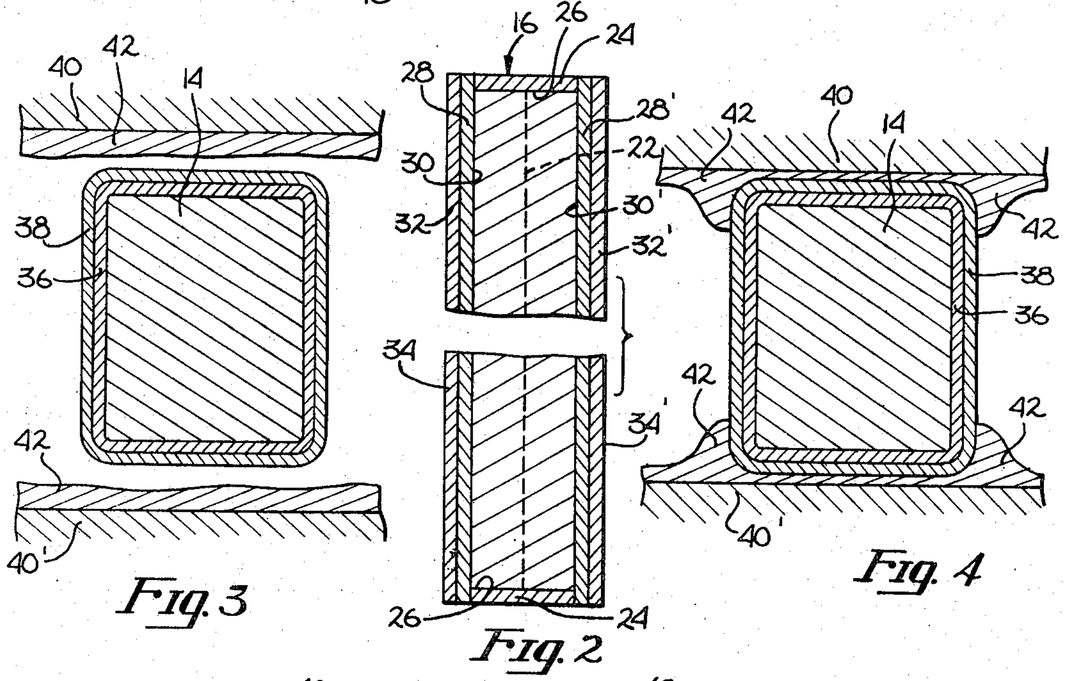
FIG. 2 is a cross-sectional view of a semiconductor die utilized in the package of FIG. 1.
FIG. 3 is a cross-sectional view of a slug, having inner and outer metallic layers deposited over its entire surface, disposed between resin coated plates prior to masking and etching.
FIG. 4 is the cross-sectional view of FIG. 3 after the resin has been reflowed so as to mask a portion of the slug.

Advantageously semiconductor die 16 is a disk-shaped chip of silicon as shown in cross-sectional view in FIG. 2. The silicon has appropriate donor and acceptor impurities diffused through it so as to from P and N conductivity type regions on either side of a junction 22. Methods for making the semiconductor die 16 are known in the art and are not part of this invention. A layer of silicon dioxide 24, disposed over the entire circumferential edge 26 of the semiconductor die 16, serves to passivate the junction 22 which terminates at the edge 26. The thickness of the layer of silicon dioxide is typically 2,000 to 12,000 angstroms. Silicon dioxide passivation can be achieved by thermal growth or conventional sputtering techniques. Single layers of nickel 28 and 28' are disposed over the faces 30 and 30' of semiconductor die 16 respectively by a process of electroless nickel plating to a thickness of approximately 80 microinches. Single layers of gold 32 and 32' are deposited over the layers of nickel 28 and 28' respectively by an immersion gold process. The thickness of the layers of gold 32 and 32' is typically about 15–25 microinches. The nickel makes an excellent mechanical and electrical bond with the semiconductor die 16 along its faces 30 and 30' on the one side and with the layer of gold 32 and 32' on the other side. The layers of gold 32 and 32' in turn are highly suitable for making excellent electrical contact with the silver coating 38 disposed over the end faces of the slugs 12 and 12'. The end faces of semiconductor die 16 are designated 34 and 34' respectively. While semiconductor die 16 has been described as a disk-shaped doped silicon structure, it should be obvious to those skilldd in the art that the semiconductor die 16 could also be made of a suitably doped silicon carbide or other semiconductor material; further, it should also be obvious that the die 16 could also have a square mesa or other suitable shape.

The slugs 12 and 12' are made of an electrically conducting material having a coefficient of thermal expansion substantially matching that on the semiconductor die 16, such as molybdenum, tungsten or Kovar (the latter being an alloy nominally composed of 29 percent nickel, 17 percent cobalt and 54 percent iron). In the embodiment of the present invention herein described, molybdenum is the preferred material because it is easier to obtain an oxide of molybdenum than it is an oxide of tungsten or Kovar. As explained more fully hereinbelow, a substantially improved seal is achieved when the glass envelope 18 interfaces with an oxide of the metal used for the slugs 12 and 12'. By substantially matching the coefficient of thermal expansion of the slugs 12 and 12' with that of the semiconductor die 16, compressive forces are prevented from building up during the temperature cycles to which the invented diode package 10 will be subjected, which compressive forces could cause damage to the die 16; in addition, a reduction in the intimacy of contact between semiconductor die 16 and slugs 12 and 12' due to differences in thermal expansion is also substantially precluded.

Figure 8:
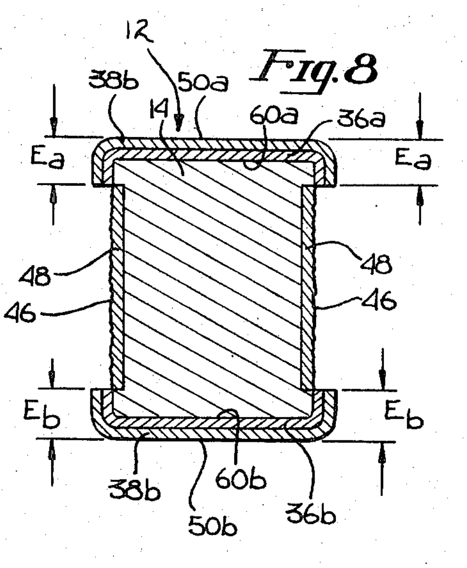
FIG. 8 is the cross-sectional view of FIG. 7 after the surface of the slug has been oxidized.
Figures 12, 13, 14:
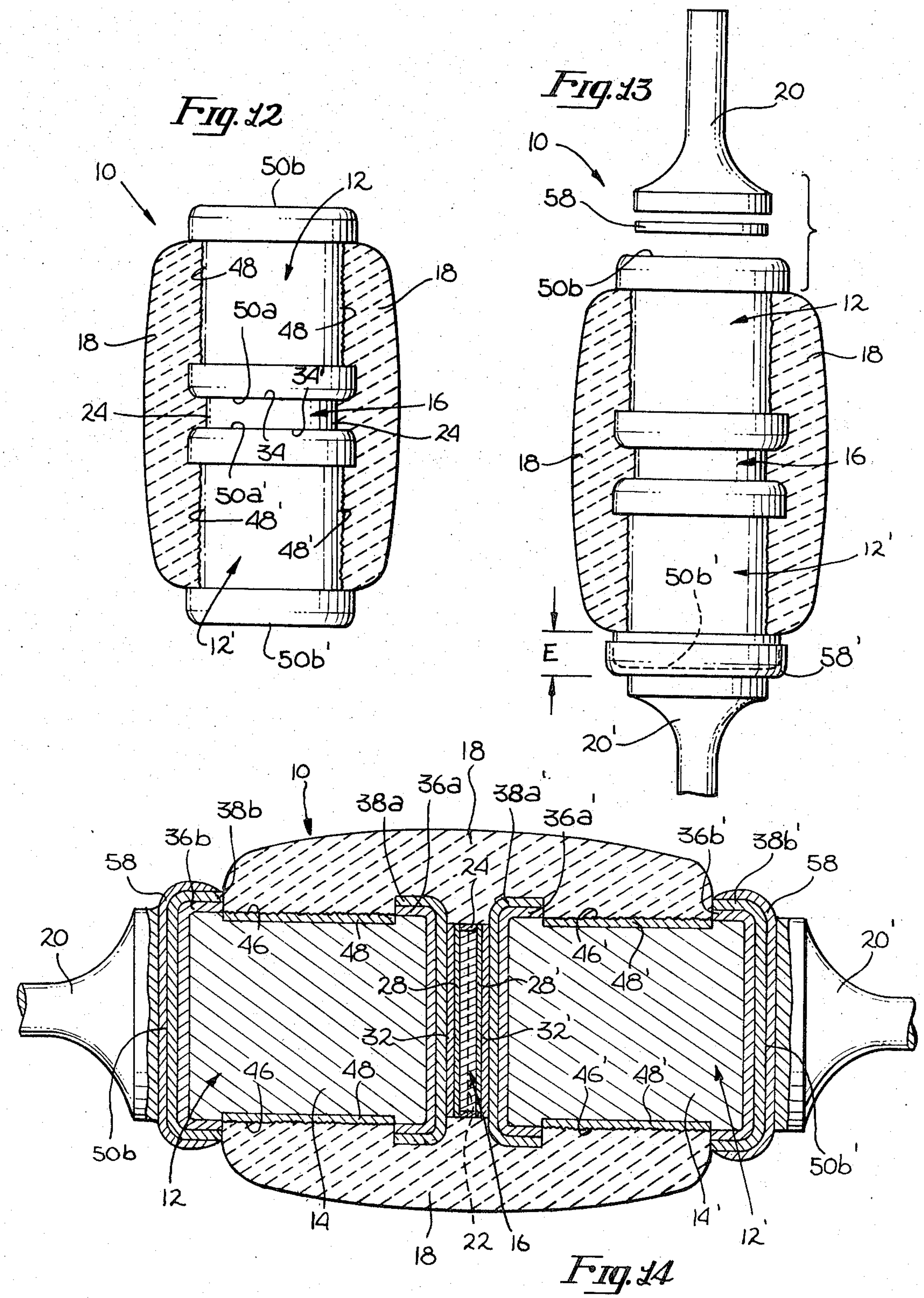
FIG. 12 is the assembly of FIG. 11 after nitrogen gas pressure has caused the glass sleeve to collapse around and fully encapsulate the slugs and semiconductor die.
FIG. 13 is the assembly of FIG. 12 after lead terminals have been brazed onto the outer faces of the slugs.
FIG. 14 is a cross-sectional view of the invented diode package after assembly.

The structure of the metallically plated polybdenum slugs 12 and 12' is shown in FIG. 8. The slug core 14 is a solid cylinder of molybdenum. A layer of nickel **36*a* is deposited over a first end face 60*a* of core 14** and circumferential edge E*a*. Similarly, a layer of nickel **36*b* is deposited over second end face 60*b* and circumferential Eb. The thickness of the nickel layers 36*a* and 36*b* is typically abut 250 microinches. Deposited over the nickel layers 36*a* and 36*b* are layers of silver 38*a* and 38*b* respectively, the thickness of the silver layers 38*a* and 38*b* also being approximately 250 microinches. The uncoated remainder of the circumferential surface of slug core 14 is coated with a layer of molybdenum oxide 48, the surface 46 of which is roughened as a result of a grain etching. The inner and outer end faces of core 12 are designated as 50*a* and 50*b* respectively. With reference to FIG. 12, the faces 34 and 34' of semiconductor die 16 are held in intimate mechanical and therefore electrical contact with slug end faces 50*a* and 50*a*' respectively by the encapsulating glass envelope 18. The glass envelope 18 is chemically bonded to the molybdenum oxide layer 48 along their interfacing surfaces. In addition to holding the assembly of die 16 and slugs 12 and 12'** together, the glass envelope seals the package from moisture, water, gas and other impurities.

The present invention includes a novel and advantageous method for making the diode package 10. The slug 12 as shown in FIG. 8 can be made in at least three ways. The first and preferred method is described with reference to FIGS. 3–8. While the following description is in respect to a single slug core 14, it should be understood that in practice the method described is applied to the processing of a large number of slug cores 14 concurrently. Initially, a solid molybdenum slug core 14 is lapped and polished by conventional techniques. It is then completely plated with the layer of nickel 36, followed by layer of silver 38. Plating of slug core 14 is by techniques known in the art. The layer of nickel 36 is advantageously used between the molybdenum of the slug core 14 and the outer layer of silver 38 in that it forms an excellent mechanical and electrical bond with each of those metals, whereas a direct silver to molybdenum bond would not be as good. In other embodiments of this invention, a thin layer of gold may be advantageously deposited between layers of nickel and silver 36 and 38 respectively.

The plated slug core 14 is then placed between a pair of flat plates 40 and 40' which have previously been coated with an adhesive resin 42 as shown in FIG. 3, which is solid at ambient room temperatures but can be reflowed at higher temperatures. The thickness of resin 42 is typically 2 mils. The purpose of the resin is to serve as a mask during the subsequent etching of the slug core 14 as described more fully hereinbelow. In the next step, the sandwich configuration depicted in FIG. 3 is heated over a period of several hours, causing the resin 42 to become a slowly flowing liquid. Consequently, the resin 42 gradually flows down from upper plate 40 along the outer surface of slug core 14. At the same time, and at approximately the same rate, the resin 42 flows up by capillary action from lower plate 40' along the outer surface of slug core 14 as shown in FIG. 4. The temperature of the resin 42 and the duration of its flow are monitored and controlled so as to stop the flow after the resin 42 has covered a suitable portion of the outer surface of slug core 14 along its longitudinal direction at both its upper and lower ends, typically 10 mils for a slug 12 having a length of 60 mils. When the resin has flowed to this point, it is cooled below the temperature that its begins to liquify. In this state, the slug core 14 is properly masked for etching. In order to achieve uniformly the circumferential masking of slug core 14 described hereinabove, the plates 40 and 40' are preferably made of ultra flat glass, and the configuration shown in FIGS. 3–4 is maintained in a substantially horizontal space relation during the step of reflowing the resin 42. Although 10 mils of circumferential masking is preferred in respect to a slug having a length of 60 mils, the amount of masking is not critical to the present invention, and masking in the range of 5–15 mils is suitable.

Figure 5:
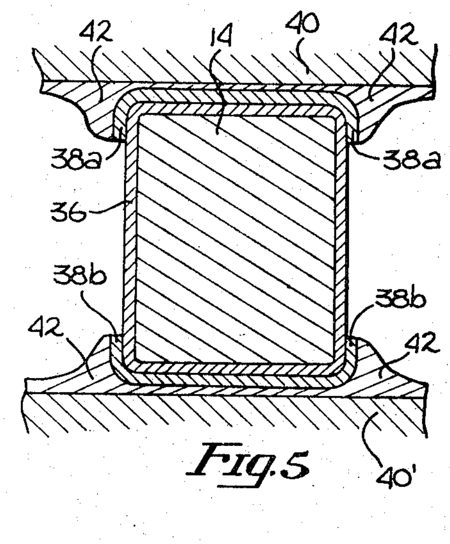
FIG. 5 is the cross-sectional view of FIG. 4 after the unmasked portion of the outer metal layer has been etched away.

In a first etching step, the layer of silver 36 is etched by subjecting the configuration of FIG. 4 to a silver etch. The etching of the layer of silver 38 is self-limiting in that the above described silver etch solution will not etch the layer of nickel 36 below the silver layer 38. Following the silver etch, the configuration of slug core 14, plates 40 and 40′ and resin 42 appear as depicted in FIG. 5. As can be seen in FIG. 5, the portions 38*a* and 38*b* of the silver layer 38, which were masked by the reflowed resin 42, remain intact.

Figure 6:
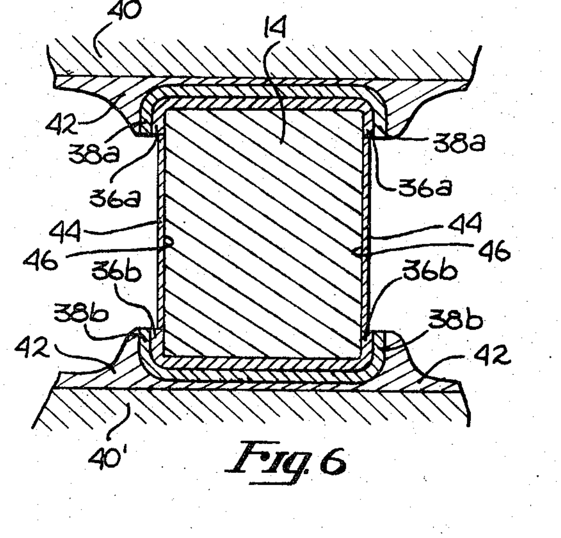
FIG. 6 is the cross-sectional view of FIG. 5 after the unmasked portion of the inner metal layer has been etched away.

In a second etching step, the layer of nickel 36 is etched by subjecting the configuration of FIG. 5 to a nickel etch. Utilizing a suitable nickel etching solution, the etching of the nickel is completed in a few minutes, the process being self-limiting in that the etching solution etches the nickel down to the underlying surface of the slug core 14 and the process stops. The etching solution does not attack the molybdenum; it does, however, form a layer 44 of an insoluble molybdenum compound, over the exposed surface 46 of slug core 14. Following the nickel etch, the configuration of slug core 14, plates 40 and 44′ and resin 42 appear as depicted in FIG. 6. As shown in FIG. 6, the portions of the nickel 36*a* and 36*b*, which were masked by the reflowed solder 42, remain intact. It should be understood that, in those embodiments of the present invention which include a thin layer of gold between the layers 36 and 38 of nickel and silver respectively, an additional step of etching the gold layer would naturally precede the above-described step of etching the nickel, unless, of course, the silver etch were so compounded to also remove the gold layer.

In lieu of masking the slug core 14 by the techniques of reflowing resin 42, a photo resist chemical mask is also contemplated by this invention. By this alternative technique, slug core 14 is first fully coated with a photo resist resin by any known method such as spray coating, roller coating or shot tower coating. The resist coated slug core 14 is then placed into a special jig (not shown) which exposes one or both of its end faces 50*a* and 50*b* and adjoining ends E*a* and E*b* of its circumferential surface. (See FIG. 8.) The exposed portions of slug core 14 are next subjected to a suitable exposure of light. The resist is then developed by conventional techniques, and the slug core 14 silver and nickel etched as described hereinabove, the developed photo resist chemical serving as the required mask. After etching, of course, the resist chemical is stripped off by a suitable solvent.

Figure 7:
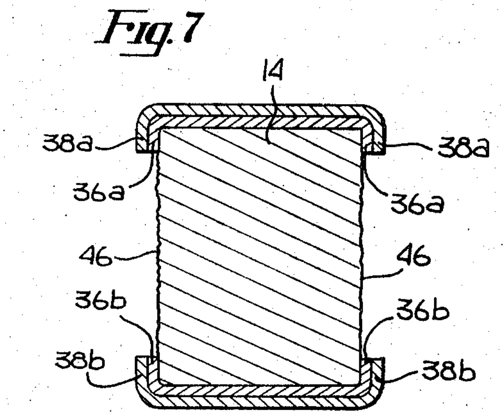
FIG. 7 is the cross-sectional view of FIG. 6 after the resin mask has been removed and the surface of the slug has been etched.

At this point, the slug core 14 is ready for a molybdenum etch which is utilized primarily to remove the layer 44 of molybdenum compound; however, an incidental benefit of the molybdenum etch lies in its grain etching the outer molybdenum surface 46 of slug core 14. The advantage of such grain etching is that it roughens the surface 46 of the slug core 12, thereby increasing the surface area and ultimately enhancing the seal achieved with the glass. It is preferable to molybdenum etch the slug core 14 after it has been removed from between plates 40 and 40′, because residual materials left from the silver and nickel etching steps tend to cause the molybdenum to strain during its etching. Thus, the slug core 14 is first dismounted from between plates 40 and 40′ by placing the configuration shown in FIG. 6 into a solvent suitable for dissolving the resin 42 used for masking the slug core 14, after which time the slug core 14 can be readily removed from between the plates 40 and 40′. Additional rinses in the solvent complete the removal of the resin. The molybdenum etch is accomplished by placing the slug core 14 into a beaker containing a fresh solution of etch. This is followed immediately by a rinse in distilled water. If desired, the slug core 14 can be etched a second time in a fresh solution followed by a rinse in distilled water. Following the molybdenum etch, the slug core 14 has the roughened surface 46 as shown in FIG. 7.

After the etching of the molybdenum as described hereinabove, there follows a silver clean-up etch. Such a clean-up etch removes contaminants and lightly polishes the now exposed silver 38*a* and 38*b*.

Following the clean-up etch, the slug core 14 is rinsed in methyl alcohol followed by a methyl ethyl keytone (MEK) rinse. After the rinse, the slug core 14 is dried, after which it is ready for the next step, oxidation.

A secoud method for making the slug 12 shown in FIG. 8 is now described. It is an alternative method to that described hereabove. First a plurality of suitably roughened molybdenum wires is bound together in a thin metal tube, after which (i) an epoxy compound is injected into the intersticial space between the wires and (ii) the tube is thinly sliced in a direction perpendicular to the longitudinal axis of the tube. The diameter of the molybdenum wire and the thickness of the slices determine the diameter and length of the resulting slug cores 14 respectively. After the faces of the slices are lapped and tumble polished, the exposed ends of wire therein are coated with the layers of nickel and silver by conventional plating or sputtering techniques. The epoxy compound is then chemically removed, freeing the slug cores 14. After being cleaned, the slug cores 14 are ready for oxidation as described hereinbelow. The method utilizing reflowed resin 42 for masking the slug cores 14 followed by etching is preferred over the method of slicing epoxy bound molybdenum wire following by metallic coating in that the former method yields slugs 12 which have substantially uniform metallic coating over their circumferential edges E*a* and E*b*, while the latter method produces core slugs 12 which have tittle, if any, metallic coating on their circumferential edges E*a* and E*b*.

A third method for making the slug 12 substantially like that shown in FIG. 8 is now described. First the molybdenum slug cores 14 are entirely coated with the required layers 36 and 38 of nickel and silver respectively (by conventional techniques). Next, the layers 36 and 38 are ground off the circumferential surfaces of the cores 14 by a centerless grinder, leaving metallic cap 36*a* and 38*a* on end face 60*a* and metallic cap 36*b* and 38*b* on end face 60*b* of cores 14. Thus, the entire circumferential surface of each core 14 is exposed molybdenum, suitably roughened by the grinder. Following a cleansing step, the cores 14 are oxidized as described hereinbelow to achieve the layer of molybdenum oxide 48. The method of mechanically grinding off the circumferential portion of metallic layers 36 and 38 is particularly suitable when slug cores 14 are of relatively large dimensions in that, with larger cores, the absence of metallic coating over the circumferential edges E*a* and E*b* is less significant. It should be understood, however, that this third method of making slugs 12 is applicable with cores 14 of any dimensions.

The slug core 14 is oxidized by being placed in a quartz oxidation chamber wherein it is subjected to a stream of oxygen for a period of time, at a temperature in the range from 250°C to 450°C. The oxygen flow rate and the particular temperature selected are controlled very closely. In addition, for uniformity are repeatability of results, the oxidation chamber should be designed so as to ensure that the oxygen stream is directed over the entire outer surface 46 of the slug 12; i.e., over all portions of the molybdenum. As a result of the oxidation, a thin coating of molybdenum oxide 48 is grown at the surface 46 of the slug 12 as shown in FIG. 8. A preferred thickness of oxide layer 48 is approximately 3,000 angstroms. While slug core 14 is exposed to the oxygen stream, no significant oxidation of the silver 38 or nickel 36 takes place.

Molybdenum oxide is readily affected by any alkaline or acid solution, even those which are relatively weak. On the other hand, molybdenum dioxide is extremely chemical resistant. Thus, it is contemplated by this invention that the layer of molybdenum oxide 48 be converted into molybdenum dioxide. The desired layer of molybdenum dioxide 48 may be obtained by placing the slug core 14 in a vacuum chamber at about 650°C for a period of from ½ – 5 minutes. It is preferable, however, to accomplish the conversion concurrently with the subsequent step of sealing slugs 12 and 12' and semiconductor die 16 in the glass sleeve 18, thereby eliminating an additional and separate oxide conversion step. The temperature utilized during the sealing step is in the range from 650°C – 800°C and, therefore, sufficient to cause the chemical reaction which results in the oxide conversion.

Thus, at this point slug 12 is complete and ready for assembly into the invented diode package 10. It should be understood that the above-described method for achieving the structure of slug 12, as depicted in FIG. 8, is equally applicable to slug 12' which is substantially identical to slug 12; and, as indicated earlier, that the above-described method is suitable for processing a large number of slugs simultaneously.

Figure 9:
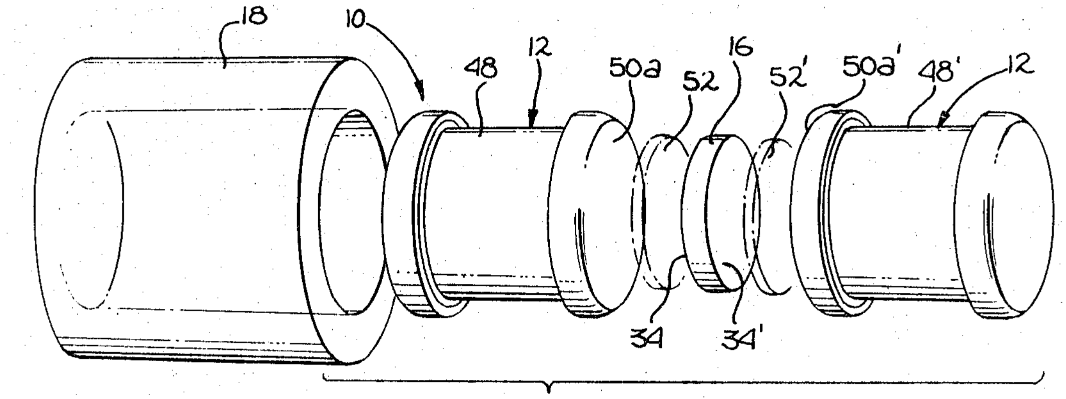
FIG. 9 is a front perspective view showing the manner of assembly of the pair of slugs, semiconductor die and glass sleeve into the invented diode package.

With reference to FIGS. 9–13, the invented method for assembling the slugs 12 and 12', the semiconductor die 16 and a glass sleeve 18 into the invented double-slug diode package 10 is described. First the slugs 12 and 12', semiconductor die 16 and glass sleeve 18 are assembled mechanically in a jig. As depicted in FIG. 9, the semiconductor die 16 is sandwiched between the pair of slugs 12 and 12'; i.e., gold end faces 34 and 34' of die 16 are placed into electrical and mechanical contact with silvered end faces **50*a* and 50*a'* of slugs 12 and 12' respectively. The present invention also contemplates the use of preforms 52 and 52' disposed between the semiconductor die 16 on each of its sides and silvered faces 50*a* and 50*a'* respectively, such preforms 52 and 52' causing the brazing of the semiconductor die 16 to the slugs 12 and 12'. A preferred preform material is a suitable alloy of silver and germanium having a brazing temperature in the range of 605°C – 800°C, the temperature range at which the glass sleeve 18 seals the die 16 and the slugs 12 and 12', as more fully explained hereinbelow. By matching the brazing temperature of the preform material to the temperature used during the sealing step, an additional brazing step is precluded and brazing and sealing are achieved concurrently at the relatively low sealing temperature contemplated by this invention. Although the inclusion of preforms 52 and 52' enhance the bonding of the semiconductor die 16 to the slugs 12 and 12', such preforms are not essential to the invented doule-slug diode package 10 in that the novel method herein disclosed for making and sealing the package 10 achieves, without brazing the die 16 to the slugs 12 and 12', a holding or assembly strength superior to that achievable by prior art methods which include such brazing. In addition, the invented method achieves, without brazing, excellent electrical contact between slugs faces 50*a* and 50*a'* and die faces 34 and 34'** respectively.

After the semiconductor die 16 is placed between slugs 12 and 12', glass sleeve 18 is slipped over the assembly. The glass is one which has a coefficient of thermal expansion substantially matching that of molybdenum and silicon, the respective materials of slugs 12 and 12' and die 16 with which the glass will be in intimate contact. By so matching the coefficients of thermal expansion, compressive forces are prevented which might otherwise build up during the temperature cycles to which the invented diode package 10 will be subjected, which compressive forces could cause damage to the die 16; in addition, a reduction of the intimacy of contact between semiconductor die 16 and slugs 12 and 12' due to differences in thermal expansion is also substantially precluded. Another very important characteristic of the glass contemplated by this invention is that it flow and form the seal with the slugs 12 and 12' at relatively low temperatures, preferably 650°C – 800°C. Such a glass allows the sealing step to be accomplished without disturbing the distribution of impurities diffused into the semiconductor die 16. For example, the diffusion of gold as an impurity in the silicon of die 16 results in a junction 22 having a very high switching speed. However, the distribution of the gold impurity is particularly temperature sensitive. Prior art methods which rely primarily upon the brazing of the semiconductor die to the slugs in order to achieve adequate mechanical strength teach the use of high temperature brazing, typically at temperatures in excess of 800°C. At such high temperatures the distribution of gold impurities is upset, thereby undermining the very performance charactertistics for which the gold was originally diffused into the semiconductor material. The present invention, on the other hand, does not rely upon the brazing of the semiconductor die 16 to to the slugs 12 and 12' in order to achieve mechanical strength, although, as indicated above, the use of low temperature preforms would enhance the bond and, therefore, the holding strength. The present invention achieves superior mechanical strength by virtue of the strength of the chemical bond between the glass of sleeve 18 and the molybdenum oxide layers 48 and 48' on slugs 12 and 12' respectively. By not requiring the high temperature brazing of the prior art for achieving mechanical strength, the present invention substantially reduces the adverse effects upon the distribution of dopants in the semiconductor material, effects directly attributable to their being subjected to temperatures in excess of 800°C. This invention, therefore, requires a glass for sleeve 18 which will flow and form a chemical seal with molybdenum oxide at temperatures in the range of 650°C – 800°C. Glasses having the aforesaid temperature characteristic as well as the requisite coefficient of thermal expansion are commercially available.

Figure 10:
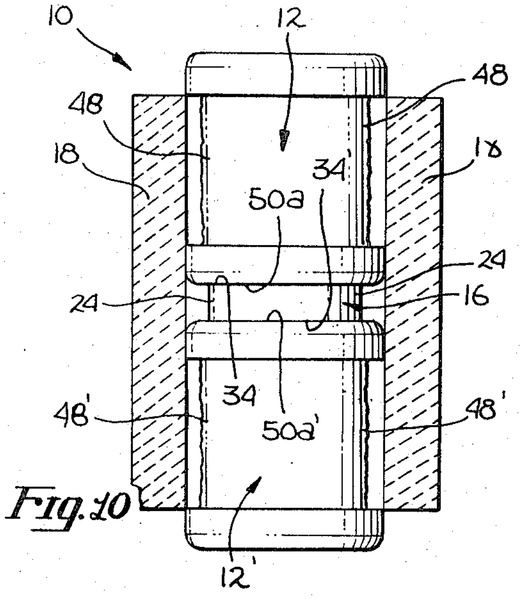
FIG. 10 is a side elevation view of the assembly of FIG. 9 with the glass sleeve, broken away, prior to the heating of the assembly in a vacuum.
Figure 11:
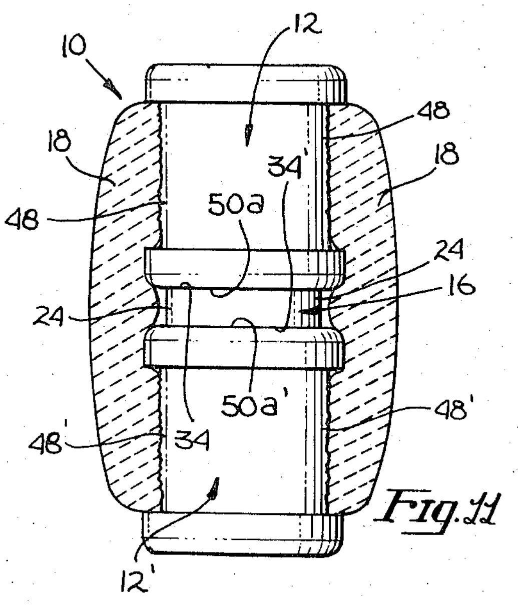
FIG. 11 is the assembly of FIG. 10 after the assembly has been heated and the glass sleeve has begun to flow.

The assembled semiconductor die 16, slugs 12 and 12' and glass sleeve 18 are shown in FIG. 10. The jig (not shown) holds the die faces 34 and 34' and the slug faces 50$a$ and 50$a'$ respectively in loose mechanical and electrical contact. The assembly of FIG. 10 is then placed into a furnace which is purged by the introduction of nitrogen for approximately 50 seconds. Thereafter, a vacuum of 250 microns is drawn. The furnace is then preheated to 300°C for 1–2 minutes, followed by heating to 650°C – 800°C. Alternatively, the furnace can be brought directly to 650°C – 800°C without the preheat step. After the assembly is subjected to the furnace temperature for about 3 to 3 ½ minutes, the glass sleeve 18 becomes molten and begins to slowly flow as shown in FIG. 11. At this time nitrogen is injected into the furnace to form rapidly an external pressure of 40–45 psi around the molten glass sleeve 18. The pressure of the nitrogen causes the glass sleeve 18 to collapse into the void created by the vacuum; that is, the pressure causes the molten glass to flow between the slugs 12 and 12' and the die 16 forming the glass envelope 18 which fully encapsulates the semiconductor die 16 and the adjacent portions of slugs 12 and 12' as shown in FIG. 12. In addition, an excellent seal is achieved between the glass envelope 18 and the slugs 12 and 12' by virtue of the chemical bond formed by the fusion of the glass and the layers of molybdenum oxide 48 and 48'. The molybdenum oxide chemically dissolves into the glass. The resulting glass to molybdenum oxide seal achieved is far superior to the glass to metal seals heretofore achievable by the methods of the prior art. The preferred duration for which the assembly is subjected to the combination of heat and pressure is approximately 1 ½ minutes, after which the furnace is rapidly cooled to below 200°C.

The above-described sealing step leaves substantially no voids between the glass envelope 18 and the semiconductor die 16, in that the glass is forced up against the circumferential passivation layer 24 of die 16, thereby permanently locking into place whatever particles or contaminants may have been entrapped in the assembly before sealing. The result is, in effect, a unitary monolithic structure. By virtue of the excellent glass to molybdenum oxide seal attainable by the invented method, a high vacuum hermeticity is also achieved. As a result, the invented diode package 10 is substantially impervious to external moisture, water, gases and impurities, while possible internally entrapped particles are immobilized and thus prevented from causing possible electrical failures in use as a result of their gradual migration to electrically sensitive locations.

The pressure to which the assembly of FIG. 11 is subjected also pushes the slugs end faces 50$a$ and 50$a'$ hard against the faces 34 and 34' of semiconductor 16, respectively, thereby improving the mechanical and electrical contact therebetween. In addition, there is some slight thermal compression bonding of the gold and silver at the aforesaid contacting faces of the slugs 12 and 12' and the semiconductor die 16 (in the absence of preforms 52 and 52'). This slight thermal compression bonding also improves the mechanical and electrical contact between the slugs 12 and 12' and the die 16. The strength of the invented diode package 10, however, is primarily and substantially the result of the glass to molybdenum oxide chemical bond.

It should be understood that temperatures higher than the temperatures disclosed hereinabove for the sealing step are not precluded by the present invention when such higher temperatures are acceptable in respect to the semiconductor performance required. Whenever the sealing step is carried out at temperatures above 650°C – 800°C, the time periods for which the assemblies are subjected to the heat, both before and after the introduction of the nitrogen gas, can range from ½ to 60 minutes, depending upon furnace techniques.

With reference to FIG. 13, the final step in the making of the invented diode package 10 is described. It relates to the attachment of conductive leads 20 and 20' silver plated end faces 50$b$ and 50$b'$ of slugs 12 and 12' respectively. The preferred method of attachment is by brazing, utilizing preforms 58 and 58' of a suitable alloy. Preform 58, typically disk-shaped, is placed between lead 20' and slug end face 50$b$; similarly, preform 58' is placed between lead 20 and slug end face 50$b'$. The entire configuration, as shown in FIG. 13, is then subjected to heat. Since one of the objects of the present invention is to obtain a superior glass to slug seal at relatively low temperatures, the brazing of the leads 20 and 20' must also be achieved at relatively low temperatures and, in particular, at a temperature below that at which the glass sleeve 18 becomes molten. This ensures that the glass-to-slug seal will not be disturbed during the step of brazing the leads 20 and 20' to the slugs 12 and 12 respectively. Typical lead materials include copper, silver, "Dumet," nickel and nickel clad silver. Preferred preforms 58 and 58' for low temperature brazing of the lead materials are eutectic alloys of gold-indium (83–77 percent gold to 17–23 percent indium by weight), and gold-tin (80 percent gold to 20 percent tin by weight). These eutectic alloys enable the satisfactory brazing of the aforesaid lead materials to the silver and nickel plated end faces of slugs 12 and 12' at temperatures in the range from 400°C to 650°C; i.e., at temperatures well below that at which the glass sleeve 18 becomes molten. During the brazing of the leads 20 and 20', the preform material typically flows onto the circumferential edge E of the slugs 12 and 12', thereby enhancing the strength of the lead bond.

FIG. 15 is a cross-sectional view of the finally assembled diode package 10 showing in detail the structural features of the preferred embodiment described hereinabove. Although this invention has been disclosed and described with reference to a particular embodiment, the principles involved are susceptible of other applications which will be apparent to persons skilled in the art. This invention, therefore, is not intended to be limited to the particular embodiment herein disclosed.

I claim:

1. The method of making a glass encapsulated semiconductor device comprising (i) a semiconductor die having first and second faces, a circumferential edge and at least one PN junction between said faces; (ii) first and second electrically conducting metal slugs, each of said slugs having at least one layer of an electrically conducting metal coated over first and second ends thereof, and a layer of an oxide of said metal coated over a circumferential surface thereof, which method comprises the steps of:

a. holding together an assembly comprised of said die, said slugs and a glass sleeve, said die and said slugs being disposed within said glass sleeve, said first and second faces of said die being in contacting relation with said first ends of said first and second slugs respectively;

b. heating the assembly of step (a) in a partially evacuated chamber until said glass sleeve becomes molten and starts to flow;

c. injecting into said chamber a gas so as to cause a rapid increase of the pressure therein, causing thereby said glass sleeve to collapse and substantially encapsulate said die and said slugs, and, further, to form a glass-to-oxide seal with said layer of oxide on each of said slugs; and d. brazing first and second leads to said second ends of said first and second slugs respectively.

2. The method of claim 1 wherein said assembly is heated to a temperature in the range from 650°C to 800°C.

3. The method of claim 1 wherein, before said heating step (b), said circumferential edge of said die and said circumferential surfaces of said slugs are in juxtaposition with the interior surface of said glass sleeve.

4. The method of claim 1 wherein said layer of oxide chemically dissolves into said glass sleeve when said glass sleeve is subjected to said heat.

5. The method of claim 1 wherein said chamber is evacuated to approximately 250 microns and nitrogen is injected into said chamber so as to cause the pressure therein to increase rapidly to a pressure in the range from 40–45 p.s.i.

6. The method of claim 1 wherein said first and second leads are brazed to said second ends of said slugs at a temperature in the range from 400°C to 650°C.

* * * * *